US009229832B2

(12) United States Patent
Edwards et al.

(10) Patent No.: US 9,229,832 B2
(45) Date of Patent: *Jan. 5, 2016

(54) TIME MONITOR

(71) Applicant: Reuters America Inc., New York, NY (US)

(72) Inventors: Timothy P. Edwards, Woodridge, IL (US); Rajasekhar R. Gunturu, Aurora, IL (US); Brian D. Sandri, Bolingbrook, IL (US); John Patrick Merrick, Aurora, IL (US)

(73) Assignee: Reuters America Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,211

(22) Filed: Feb. 6, 2015

(65) Prior Publication Data

US 2015/0156097 A1  Jun. 4, 2015

Related U.S. Application Data

(62) Division of application No. 13/708,006, filed on Dec. 7, 2012, now Pat. No. 9,053,106, which is a division of application No. 11/466,258, filed on Aug. 22, 2006, now Pat. No. 8,345,561.

(51) Int. Cl.
*G01R 31/08* (2006.01)
*G06F 11/30* (2006.01)
*H04L 12/26* (2006.01)

(52) U.S. Cl.
CPC ........ *G06F 11/3006* (2013.01); *H04L 43/0852* (2013.01); *H04L 43/0876* (2013.01); *H04L 43/10* (2013.01); *H04L 43/106* (2013.01)

(58) Field of Classification Search
CPC ..................................................... H04W 24/00
USPC ......... 370/252, 253, 472–475, 537, 542, 543, 370/508, 509, 510, 512, 516, 517
See application file for complete search history.

(56) References Cited

U.S. PATENT DOCUMENTS 5,245,634 A  9/1993  Averbuch
6,041,352 A  3/2000  Burdick et al.
(Continued)

OTHER PUBLICATIONS

Dimitris Kamenopoulos, et al., "Distance Measurement in Volunteer Computing Networks: A Completely Decentralized Approach" Third IEEE International Symposium Network Computing Applications (NCA '04) Aug. 30-Sep. 1, 2004, pp. 399-404.

*Primary Examiner* — Samina Choudhry
(74) *Attorney, Agent, or Firm* — Banner & Witcoff, Ltd.

(57) ABSTRACT

A method and system for measuring latency is provided. A monitor node is used to measure latency in a computer network or in a computing device by time stamping signal messages sent from nodes in the computer network and/or tasks in a particular node or device. The time stamps are generated using a system clock of the monitor node to reduce any discrepancies in timing. In addition, the monitor node may compensate for latencies between the monitor node and each of the one or more nodes or devices across which latency is to be measured. Signal messages may include a data message ID and/or a node ID identifying the message that is being tracked and for which latency is being measured. Latency may further be measured across multiple tasks being performed in the same or different nodes or devices by transmitting signal messages for each of the multiple tasks.

20 Claims, 5 Drawing Sheets

(56) References Cited

U.S. PATENT DOCUMENTS

| | | |
|---|---|---|
| 6,104,729 A | 8/2000 | Hellum et al. |
| 6,370,161 B1 | 4/2002 | Ehrlich et al. |
| 6,560,209 B1 | 5/2003 | Alamouti et al. |
| 6,665,730 B1 | 12/2003 | Michelson et al. |
| 6,868,069 B2 | 3/2005 | Knobbe et al. |
| 7,023,883 B1 | 4/2006 | Lui et al. |
| 7,069,325 B1 | 6/2006 | Lu et al. |
| 7,353,516 B2 | 4/2008 | Heidari-Bateni et al. |
| 7,583,898 B1 | 9/2009 | Dalton et al. |
| 2002/0053985 A1 | 5/2002 | Nesbitt |
| 2002/0131101 A1 | 9/2002 | Ohira et al. |
| 2005/0028171 A1 | 2/2005 | Kougiouris et al. |
| 2005/0097196 A1 | 5/2005 | Wronski et al. |
| 2005/0125150 A1 | 6/2005 | Wang et al. |
| 2006/0056459 A1 | 3/2006 | Stratton et al. |
| 2006/0056563 A1 | 3/2006 | Aweya et al. |
| 2006/0059270 A1 | 3/2006 | Pleasant et al. |
| 2006/0095591 A1 | 5/2006 | Kelly |
| 2007/0274229 A1 | 11/2007 | Scholl et al. |
| 2008/0005354 A1 | 1/2008 | Kryskow et al. |
| 2009/0243934 A1 | 10/2009 | Ameti et al. |

| Message ID | Sender ID | Time Received |
|---|---|---|
| 1 | Computer A | T1 |
| 1 | Computer C | T2 |

FIG. 5A

| Message ID | Sender ID | Time Received |
|---|---|---|
| 2 | Computer A | T3 |
| 2 | Computer B | T4 |
| 2 | Computer C | T5 |

FIG. 5B

| Message ID | Sender ID | Time Received |
|---|---|---|
| 2 | Computer A - sub task begin | T6 |
| 2 | Computer A - sub task end | T7 |
| 2 | Computer B - receives message | T8 |
| 2 | Computer B - sub task 1 begins | T9 |
| 2 | Computer B - sub task 1 ends | T10 |
| 2 | Computer B - sub task 2 begins | T11 |
| 2 | Computer B - sub task 2 ends | T12 |
| 2 | Computer C - receives message | T13 |
| 2 | Computer C - sub task 1 begins | T14 |
| 2 | Computer C - sub task 1 ends | T15 |

FIG. 5C

TIME MONITOR

RELATED APPLICATIONS

This application is a divisional of and claims priority to U.S. Ser. No. 13/708,006, filed Dec. 7, 2012 and entitled "Time Monitor," which is a divisional of and claims priority to U.S. Ser. No. 11/466,258, filed Aug. 22, 2006 and entitled "Time Monitor." Each of the foregoing applications is hereby incorporated by reference in its entirety herein.

FIELD OF ART

The invention relates generally to a method and a system for enhancing the accuracy of network performance measurements. Specifically, the invention relates to a system and method for obtaining synchronized timestamps to accurately measure latency in a network environment.

BACKGROUND

Computer networks are an integral part of many industries and, in particular, to their daily operations. For example, the financial industry relies heavily on information transmission over computer networks to keep a constant watch on the latest financial trends and forecasts. Financial forecasts and data may change at a submillisecond frequency. Similarly, with the advent of on-line gaming, the reliability and speed of data transmission over computer networks has also come into focus. In each of the aforementioned examples as well as in many other scenarios, measuring various aspects of network performance such as latency is often important to ensure that messages and data are appropriately processed and addressed. Such measurements allow network users to compensate for latency when implementing services or programs.

Current methods of measuring latency typically involve a master clock that synchronizes the clocks of each node in the computer network so that, theoretically, the timestamps at each node are synchronized. However, such methods often do not account for the delays between the master clock and each of the nodes the master clock is synchronizing. In addition, having each node provide its own timestamps and/or independently calculate the latency of the network consumes processing resources of the node.

For the foregoing reasons, a system and method of enhancing the accuracy and processing efficiency of measuring latency is needed.

SUMMARY

Many of the aforementioned problems are solved by providing a method and system that facilitates the measurement of latency. Latency may refer to either a latency between two nodes in a network or an application latency involving at least one task. Using a monitor node different and/or separate from the nodes in a transmission path, network latency may be measured across the transmission path using the monitor node's clock. Using a single clock (i.e., the monitor node's clock) to produce time stamps when each node in the transmission path receives a message reduces inaccuracies that may result from differences in clock settings and/or network latency. In addition, using a monitor node to track and calculate network latency reduces load on each of the transmission nodes. The monitor node, when generating time stamps, may further compensate for latency between the monitor node and each of the nodes in the transmission path by periodically and/or continuously measuring any such latency. In one or more arrangements, the latency between nodes in the transmission path may be calculated by determining the difference between time stamps.

According to one or more aspects, the monitor node may produce time stamps in response to a signal message sent by each of the nodes in the transmission path. The signal message may be sent by each node at some point after receiving a data message. The signal message may include a variety of information including a node/sender identifier (ID) and/or a message identifier (ID). The information contained in the signal message allows the monitor node to more accurately determine network latency by calculating differences in time stamps for a single message transmitted over the path. The node ID may be used to identify an order in which the nodes received and/or processed the message.

In yet another aspect, latency may be measured across multiple tasks and/or processes in one or more nodes. Thus, a single node may transmit one or more signal messages to the monitor node to track the start and end of a particular task or process performed thereon. Accordingly, latency may be measured between a task associated with a message performed at a first node and receipt of the message at a second node. Alternatively or additionally, latency may be measured between a task associated with a message performed at a first node and a task associated with the same message performed at a second node.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which:

FIGS. 5A, 5B and 5C are tables illustrating the tracking and storage of time stamps according to one or more aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
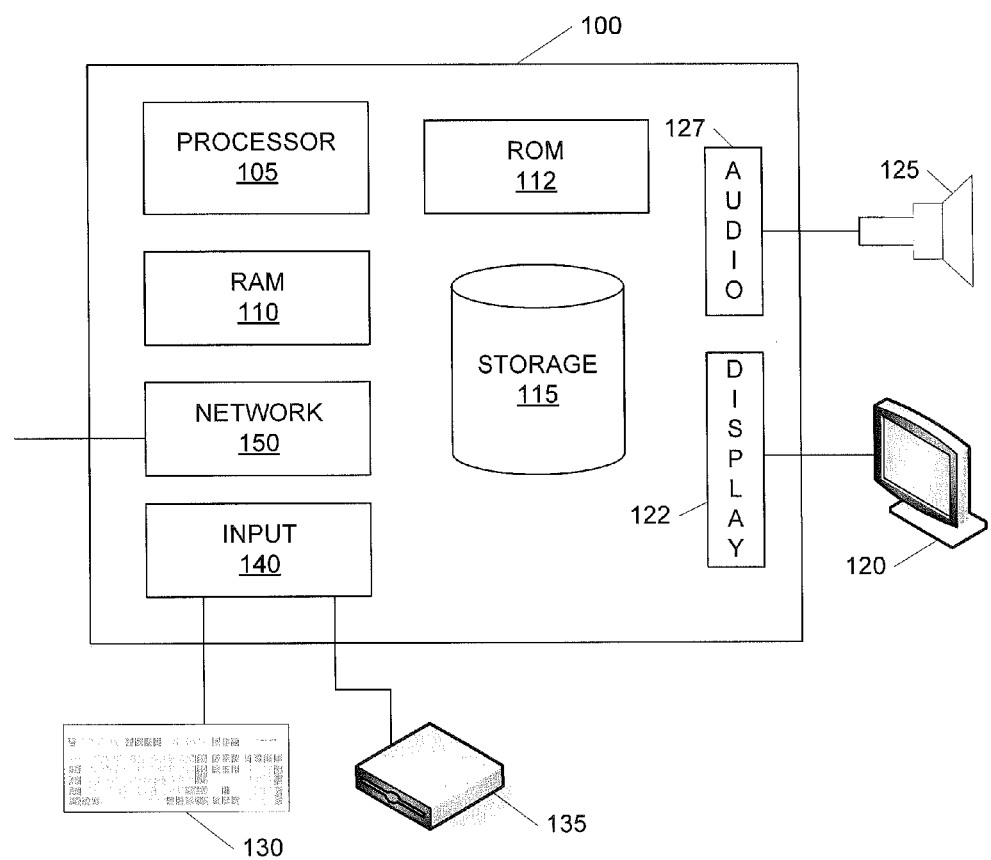
FIG. 1 illustrates a block diagram of a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In one or more instances, a device such as media drive 135 may act as both an input and output device allowing users to both write and read data to and from the storage media (e.g., DVD-R, CD-RW, etc.).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a world wide network such as the Internet. Adapter 150 may include one or more sets of instructions relating to one or more networking protocols. For example adapter 150 may include a first set of instructions for processing IP network packets as well as a second set of instruction associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
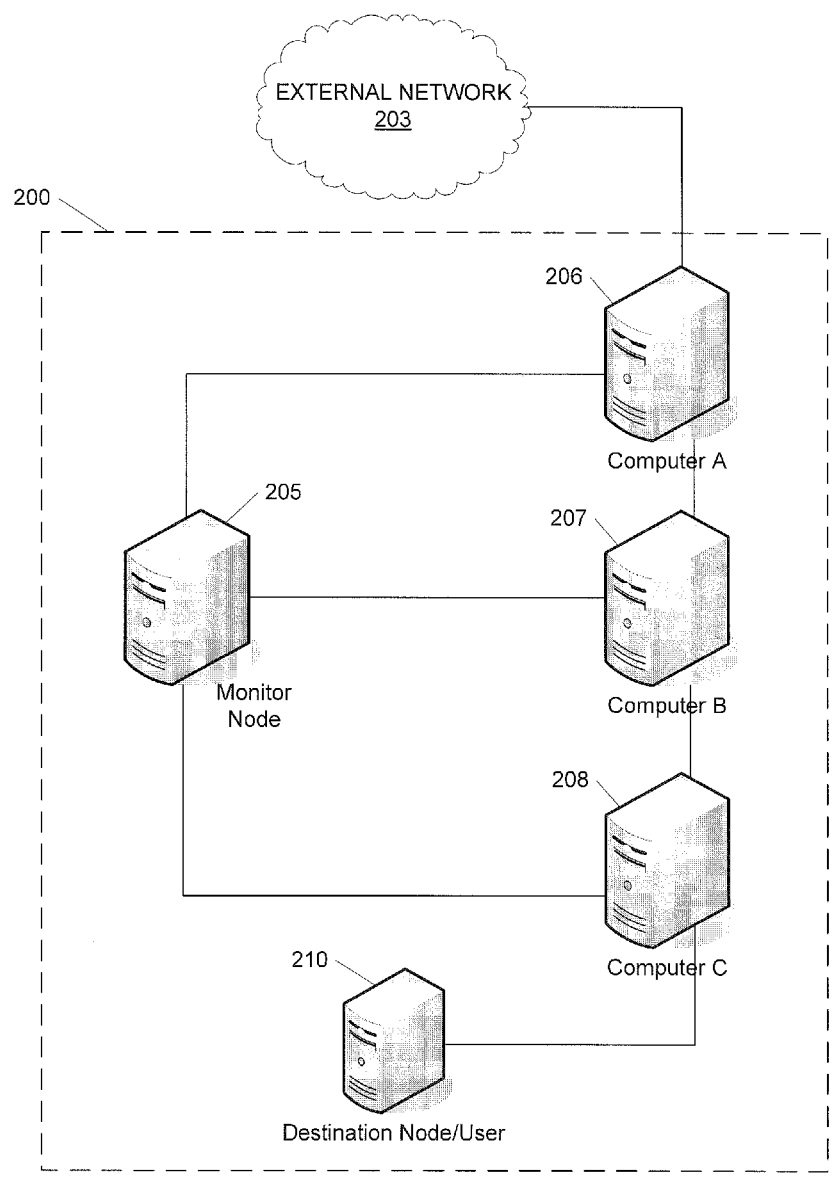
FIG. 2 is a diagram of a computer network according to one or more aspects described herein.
Figure 3:
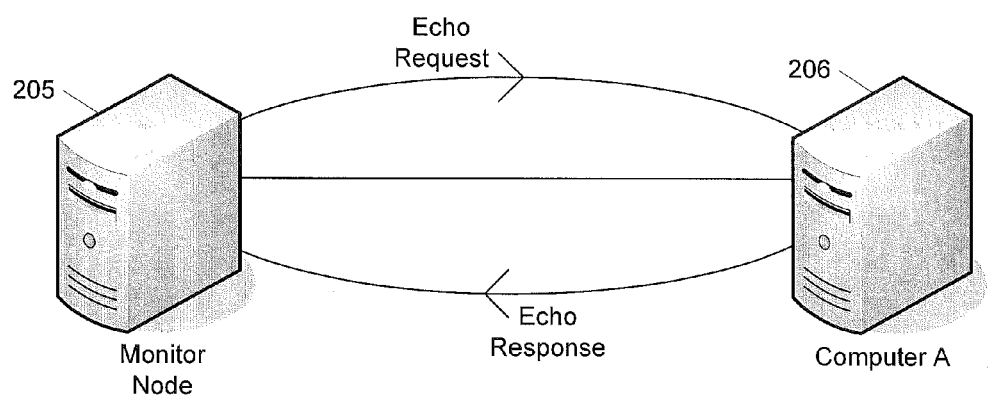
FIG. 3 illustrates a process for measuring network latency between two nodes according to one or more aspects described herein.

FIG. 2 is a diagram illustrating computer network 200 formed by four node devices 205, 206, 207 and 208. Node devices 205, 206, 207 and 208 may be any number of networking devices including Personal Data Assistants (PDAs), computers such as computer 100 of FIG. 1 and/or wireless communication devices. In particular, according to one or more aspects, node device 205 may serve as a central monitor node to which each of the other devices 206, 207 and 208 are connected. Central monitor node 205 may act as a central repository for data or perform central processes such as time stamping incoming messages and calculating a latency over a transmission path such as the path defined by nodes 206, 207 and 208. Latency, as used herein, may relate to network latency between two or more network nodes and/or latency between two or more task processes within the same node or different nodes. Latency may also refer to a delay between the start of a process involving a message at a first node, e.g., node 206, and receipt of the message at a second node such as node 207. One of skill in the art will appreciate that latency may be measured over various combinations of processes and/or nodes.

In one or more arrangements, monitor node 205 may be a dedicated node for determining latency and/or other network statistics and might not be part of a path along which an incoming message is transmitted. Alternatively, monitor 205 may perform other functions and/or run other applications. Monitor node 205 may be a separate and/or different device or system than nodes 205, 206, 207 and 208 in the transmission path. Nodes 205, 206, 207 and 208 may be interconnected using wired or wireless network connections or both. For example, node 206 may be connected to node 207 via a wireless network connection while 207 may be connected to node 208 through a wired connection such as a Local Area Network (LAN) connection. The network connections between each of nodes 205, 206, 207 and 208 may be either bidirectional or unidirectional. That is, a node such as node 205, 206, 207 or 208 might only be capable of receiving data from or transmitting data to another node. Alternatively, a node may be able to transmit and receive data to and from a connected node. Such a scheme may be implemented by design to direct incoming messages along a particular network path. Incoming messages and/or data may also be directed along a specified transmission path to insure that appropriate processing is performed at each of the nodes in the path.

In one or more arrangements, computer network 200 may be implemented within an organization or company to field and process incoming data messages. In such arrangements, a node in network 200 such as node 206 may act as a gatekeeper node for information received from or transmitted to an external network 203 like the Internet. Accordingly, nodes 207 and 208 might not be able to transmit and/or receive messages from external networks without the messages first passing through node 206. As discussed, an incoming message may be restricted to a particular network path. The network path may, in one or more examples, begin at node 206, continue to node 207 and end at node 208. An end node, as used herein, generally relates to the last node in a transmission path whereas a head node generally refers to the first node in the transmission path. One of skill in the art will appreciate that a node may be both a head node and an end node depending on a direction of transmission. In one or more instances, end node 208 may be configured to route incoming messages to a destination address and/or user 210 specified in the incoming messages after the messages have been processed through an initial network transmission path such as the path defined by nodes 206, 207 and 208. Each of nodes 206, 207 and 208 in the transmission path may be assigned to perform one or more initial processing an incoming message that may include authentication of a message source, filtering message content and determining message recipient(s). During message processing, nodes 206, 207 and/or 208 may further communicate with central node 205 for various purposes including time stamping and data storage To determine latency between two nodes such as devices 206 and 207 in a network, a delay in transmission of a particular message between the two nodes may be tracked by a third node or system such as monitor node 205. For example, each of the two nodes 206 and 207 may send a signal message to a monitor node such as node 205 upon receipt of the particular message. The signal message may, in one or more instances, include a request for a time stamp. Monitor node 205 may generate a time stamp in response to such signal messages and store the time stamp in a database of node 205. Based on the difference between the time stamp of the first node 206 and the time stamp of the second node 207, the delay or latency of transmitting the message between the first and second nodes 206 and 207 may be calculated. Using a third party node such as monitor node 205 to track and store time stamps and calculate latency reduces the processing load on nodes 206 and 207 and may enhance accuracy between the time stamps.

In some instances, delays may exist between monitor node 205 and each of the two network nodes 206 and 207 that may affect the accuracy of the generated time stamps. For example, node 206 may transmit a signal message indicating receipt of a particular message 200 ms prior to receipt by monitor node 205. Since monitor node 205 might only generate a time stamp upon receipt of the signal message, the time stamp may be 200 ms past the actual time of message receipt by node 206. As such, monitor node 205 may compensate for such delays by initially measuring the latency associated with each of the two network nodes 206 and 207 and modifying a generated time stamp accordingly. As an example, device 205 may measure latency between device 205 and device 206 by transmitting an echo request to device 206 and waiting for a response. Based on the round trip time associated with sending the echo request and receiving a response to the echo request, central node device 205 may determine the delay associated with a one-way transmission by dividing the round trip time in half. Central node device 205 may take multiple measurements (i.e., transmit multiple echo requests) and average the round trip times associated with the multiple measurements to obtain a more accurate estimation of the latency along the network path. Upon determining the latency associated with each of network nodes 206 and 207, monitor node 205 may adjust time stamps generated for each node 206 and 207 accordingly.

Figure 4:
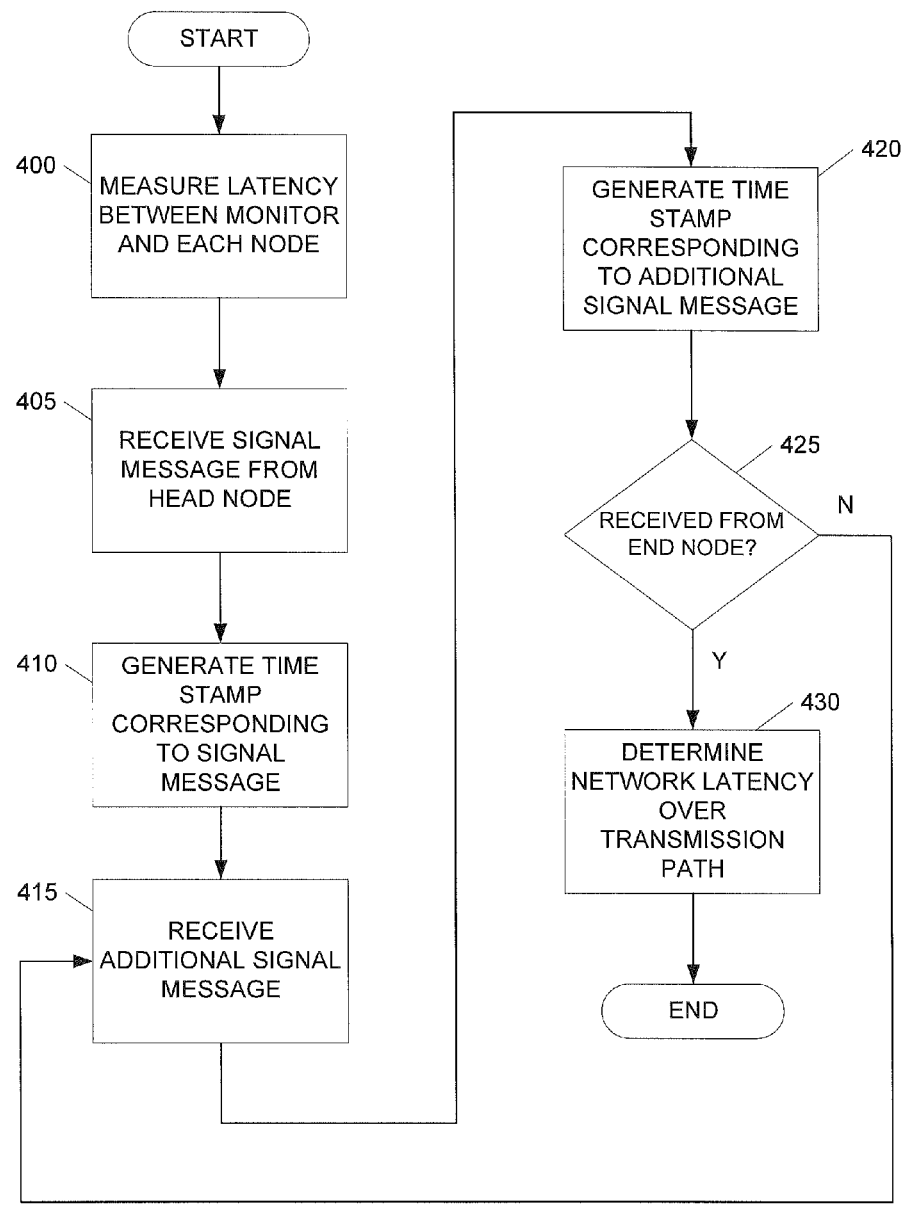
FIG. 4 is a flowchart illustrating a method for measuring network latency over a network using a monitor node according to one or more aspects described herein.

FIG. 4 is a flowchart illustrating a method for measuring latency over a message transmission path. In step 400, a monitor device or monitor node (e.g., node device 205) may initially measure the latency associated with the network links between the monitor node and each of the nodes in a transmission path. The latencies may be measured by determining a round trip time corresponding to the transmission and receipt of an echo request transmitted to each of the nodes. For example, in a network including a head node, an intermediate path node (e.g., node 207) and an end node (e.g., node 208), the monitor node may initially determine a latency between the monitor node and each of the three nodes. In step 405, the monitor device may receive a signal message from a head node that is located at the beginning of the transmission path. A signal message, as used herein, generally refers to a message transmitted by a path node to the monitor node or device in response to receiving a data message. The signal message is configured to trigger the generation of a time stamp by the monitor node. A signal message may include a variety of information including a message identifier corresponding to the message received at the path node and/or a node identifier specifying the identity of the path node from which the signal message was received. A variety of other information may also be included in the signal message including the content of the message and/or a source of the message.

In response to the signal message from the head node, the monitor node may generate and store a time stamp according to an internal clock in step 410. In generating the time stamp, the monitor node may adjust the time stamp to compensate for any latency between the monitor node and the head node measured in step 400. Such a process may be performed to normalize potential delays or time differences caused by network connections between the head node, or any path node, and the monitor node. The time stamp may be stored using the sender ID, the message ID or both to facilitate the determination of latency. In one example, time stamps may be stored in association with the message ID so that the latency experienced by the message corresponding to the message ID may be determined. In step 415, the monitor node may receive a further signal message from a second path node. In response to the signal message from the second path node, the monitor node may generate and store a time stamp in step 420 in similar fashion to the process described in step 410. In step 425, the monitor node may further determine whether the second path node is the end node in the transmission path. In one or more arrangements, the monitor node may have a priori knowledge of the transmission path setup. That is, the monitor node may know the sequence and order of nodes, and the nodes' corresponding sender IDs, that are part of the transmission path. As such, based on the sender ID included in the signal message, the monitor node may determine whether the node sending the signal message is the end node. If the monitor node determines that the second path node is not the end node, the monitor node may wait for additional signal messages and process the signal messages in accordance with steps 415 and 420.

If, however, the second path node is the end node, the monitor node may extract the stored time stamps associated with the particular message ID to calculate a latency over the transmission path in step 430. In particular, a time difference may be determined between the time stamp associated with the end node and the time stamp associated with the head node. This determined time difference may represent the latency over the entire path based on the transmission times of the message corresponding to the message ID. Latency may also be calculated for segments of the transmission path using the stored time stamps associated with the nodes at the head and tail of the transmission path segment. The monitor node may also use the time stamps to calculate additional statistics and information about the transmission path and/or a particular node thereof.

FIGS. 5A, 5B and 5C illustrate the storage of time stamps in tables along with a message ID and a sender ID. In FIG. 5A, for example, the monitor node generated time stamps for each of nodes Computer A and Computer C. In particular, Computer A received message 1 at time T1 while Computer C received message 1 at time T2. The latency associated with the transmission path between Computer A and Computer C may be calculated by determining the difference between time T2 and time T1. In FIG. 5B, a time stamp T4 is stored for an intermediate node Computer B that resides between Computer A and Computer C. In such a scenario, not only can the latency between Computer A and Computer C be determined, the latency of the transmission path segment between Computer A and Computer B and/or the latency of the path segment between Computer B and Computer C may also be calculated.

In one or more configurations, latency may be determined between components of a single computer system or device. For example, a computer device such as computer 100 may process two different tasks associated with a particular data message. The latency involved in the processing of the first task and the second task may be determined in much the same way as the methods and systems described herein. In other words, the first task may be treated as a first node and the second task may be treated as a second node. Accordingly, once the first task receives the data message for processing, the task may issue a signal message to the monitor node. Similarly, once the second task receives the data message, the second task may also issue a signal message to the monitor node. Based on the time stamps generated in response to each of the signal messages, the latency between the task processes may be determined.

Yet further, latency measurements may be performed across task processes and nodes in a computer network. In other words, latency may be measured between the completion of a task associated with a data message at a first node and receipt of the same data message at a second node. FIG. 5C illustrates a table of time stamps associated with nodes Computer A, Computer B and Computer C as well as various tasks performed by each node. For example, a time stamp T6 is assigned to the beginning of a sub task performed by Computer A in association with Message ID 2. Subsequently, Computer B may receive Message ID 2 at time T8 and complete sub task 1 at time T10. Using the stored time stamps, the monitor node may determine the latency over a variety of network segments and/or tasks that may include different devices, applications and processes.

The systems and methods described herein may be used in a wide array of applications. For example, latency measurements may be conducted as part of a network diagnostic system and/or reliability testing. Specifically, latency may be measured to determine if one or more nodes in a network is producing unreasonable delays in message delivery. Similarly, the latency measurement techniques described herein may also be used to compensate for network delays in time sensitive applications. Stock brokerage firms, for example, may want to determine the precise time at which a stock purchaser submitted an order. In the financial industry, a few seconds delay may correspond to a substantial change in stock price. As such, determining the network latency in receiving and processing the order may allow a financial firm to analyze their network and application latency. This, in turn, can allow them to more quickly react to changing market conditions.

Further, latency measurements may be used in a variety of applications. For example, in an on-line gaming environment hosted by multiple servers, a server may be automatically selected based on a measured latency between a user and each of the multiple servers. Latency measurements may further be used to detect portions of a network that are creating significant delays in an overall network.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. An apparatus, comprising:
a network adapter configured to:
receive a message at the apparatus from a first node, wherein the first node is a source other than a monitor node; and
transmit a second signal message to the monitor node from the apparatus in response to receiving the message from the first node, wherein the second signal message includes a message identifier and a node identifier;
at least one processor; and
memory storing computer-executable instructions that, when executed by the at least one processor, cause the apparatus to determine the message identifier associated with the message,
wherein the second signal message is different from the received message and indicates that the apparatus is an end node,
wherein the second signal message is configured to cause the monitor node to produce a time stamp associated with the second signal message, to determine that the apparatus is the end node, and to determine a latency between the first node and the apparatus by calculating a difference between a first time at which a first signal message is received from the first node and the time stamp,
wherein the first node is part of a transmission path of the received message,
wherein one or more additional nodes are part of the transmission path between the first node and the apparatus and the one or more additional nodes receive the message and transmit one or more additional signal messages to the monitor node to cause the monitor node to produce a time stamp associated with each of the one or more additional signal messages, and
wherein the monitor node is separate from the transmission path.

2. The apparatus of claim 1, wherein the step of transmitting the second signal message to the monitor node is further responsive to one of initiation of a task and completion of the task.

3. The apparatus of claim 1, wherein the first node is a logical node.

4. The apparatus of claim 3,
wherein the memory stores additional computer-executable instructions that, when executed by the at least one processor, cause the apparatus to process the message in accordance with a task, and
wherein the step of transmitting the second signal message to the monitor node is further responsive to completion of the task.

5. The apparatus of claim 1, wherein the network adapter is further configured to:
receive an echo request from the monitor node; and
transmit a response to the echo request to the monitor node.

6. The apparatus of claim 5, wherein the monitor node is configured to produce the time stamp based on a round trip time associated with the echo request.

7. A computer network, comprising:
a first node configured to:
transmit a message; and
transmit, to a monitor node, a first signal message;
a second node configured to:
receive the message from the first node;
determine a message identifier associated with the message; and transmit a second signal message to the monitor node in response to receiving the message from the first node, wherein the second signal message indicates that the second node is an end node and wherein the second signal message includes the message identifier and a node identifier; and the monitor node configured to:
in response to receiving the second signal message, produce a time stamp associated with the second signal message;
determine that the second node is the end node; and
determine a latency between the first node and the second node by calculating a difference between a first time at which the first signal message is received from the first node and the time stamp,
wherein the first node is part of a transmission path of the message,
wherein one or more additional nodes are part of the transmission path between the first node and the second node and the one or more additional nodes receive the message and transmit one or more additional signal messages to the monitor node to cause the monitor node to produce a time stamp associated with each of the one or more additional signal messages, and
wherein the monitor node is separate from the transmission path of the message.

8. The computer network of claim 7, wherein the first node is a source of the message.

9. The computer network of claim 7, wherein the first node is a first node in the transmission path of the message.

10. The computer network of claim 7, wherein transmitting the second signal message to the monitor node is further responsive to one of initiation of a task and completion of the task.

11. The computer network of claim 7, wherein the first node is a logical node.

12. The computer network of claim 11,
wherein the second node comprises memory storing computer-executable instructions that, when executed by at least one processor, cause the second node to process the message in accordance with a task, and
wherein the second node is configured to transmit the second signal message to the monitor node in further response to completion of the task.

13. The computer network of claim 7, wherein the second node is further configured to:
receive an echo request from the monitor node; and
transmit a response to the echo request to the monitor node.

14. The computer network of claim 13, wherein the monitor node is configured to produce the time stamp based on a round trip time associated with the echo request.

15. A method, comprising:
receiving, by a second node, a message from a first node;
determining, by the second node, a message identifier associated with the message; and
transmitting, by the second node, a second signal message to a monitor node in response to receiving the message from the first node, wherein the second signal message is different from the message and indicates that the second node is an end node and wherein the second signal message includes the message identifier and a node identifier;
wherein the second signal message is configured to cause the monitor node to produce a time stamp associated with the second signal message, to determine that the second node is the end node, and to determine a latency between the first node and the second node by calculating a difference between a first time at which a first signal message is received from the first node and the time stamp,
wherein the first node is part of a transmission path of the message,
wherein one or more additional nodes are part of the transmission path between the first node and the second node and the one or more additional nodes receive the message and transmit one or more additional signal messages to the monitor node to cause the monitor node to produce a time stamp associated with each of the one or more additional signal messages, and
wherein the monitor node is separate from the transmission path of the message.

16. The method of claim 15, wherein the transmitting the second signal message to the monitor node is further responsive to one of initiation of a task and completion of the task.

17. The method of claim 15, wherein the first node is a first node in the transmission path of the message.

18. The method of claim 15, further comprising:
processing the message in accordance with a task,
wherein the transmitting the second signal message to the monitor node is further responsive to completion of the task.

19. The method of claim 15, further comprising:
receiving, by the second node, an echo request from the monitor node; and
transmitting a response to the echo request to the monitor node.

20. The method of claim 19, wherein the monitor node is configured to produce the time stamp based on a round trip time associated with the echo request.

* * * * *